US005628283A

United States Patent [19]
Huegelmeyer

[11] Patent Number: 5,628,283
[45] Date of Patent: May 13, 1997

[54] COLLAR FOR ANIMALS

[76] Inventor: Bernhard Huegelmeyer, Wilhelmstrasse 97, 49078, Osnabrueck, Germany

[21] Appl. No.: 509,680

[22] Filed: Jul. 31, 1995

[30] Foreign Application Priority Data

Aug. 1, 1994 [DE] Germany .............. 9412369 U

[51] Int. Cl.$^6$ .......................... A01K 27/00; A01K 13/00
[52] U.S. Cl. .......................................................... 119/815
[58] Field of Search ................................ 119/815, 821, 119/837, 850, 855

[56] References Cited

U.S. PATENT DOCUMENTS

| 439,598 | 10/1890 | Huntoon et al. | 119/815 |
| 2,595,302 | 5/1952 | Sanders | 119/821 |
| 2,704,428 | 3/1955 | Sessler | 119/815 |
| 4,345,548 | 8/1982 | Krebs et al. | 119/855 |
| 4,489,676 | 12/1984 | Colquist | 119/815 |
| 5,469,814 | 11/1995 | Moy et al. | 119/815 |

*Primary Examiner*—Robert P. Swiatek
*Assistant Examiner*—Elizabeth Shaw
*Attorney, Agent, or Firm*—Jordan and Hamburg

[57] ABSTRACT

A neck collar for preventing animals from licking parts of their body includes a collar structure having a closed position and an open position, the collar structure when in its closed position being in the form of an elongated tube which is disposed about the animal's neck. The tube has a forward edge and a rear edge, the forward edge extending up to and under the animal's head such that the head of the animal prevents the tube from being moved further up along the animal's neck. The rear edge extends to the chest and shoulders of the animal such that the chest and shoulders of the animal prevent the tube from being moved further down along the animal's neck, whereby the collar structure prevents the animal from licking parts of its body.

8 Claims, 4 Drawing Sheets

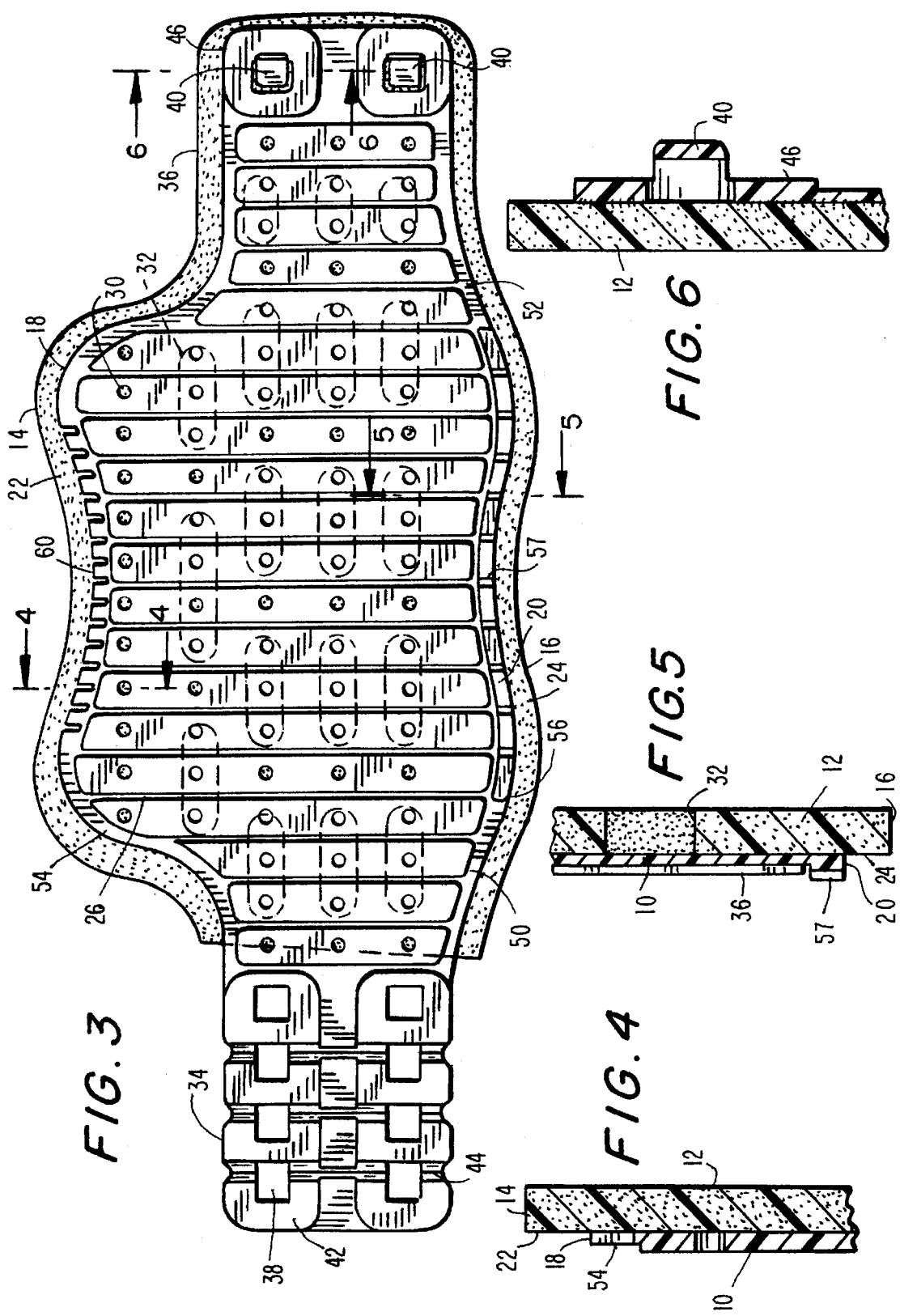

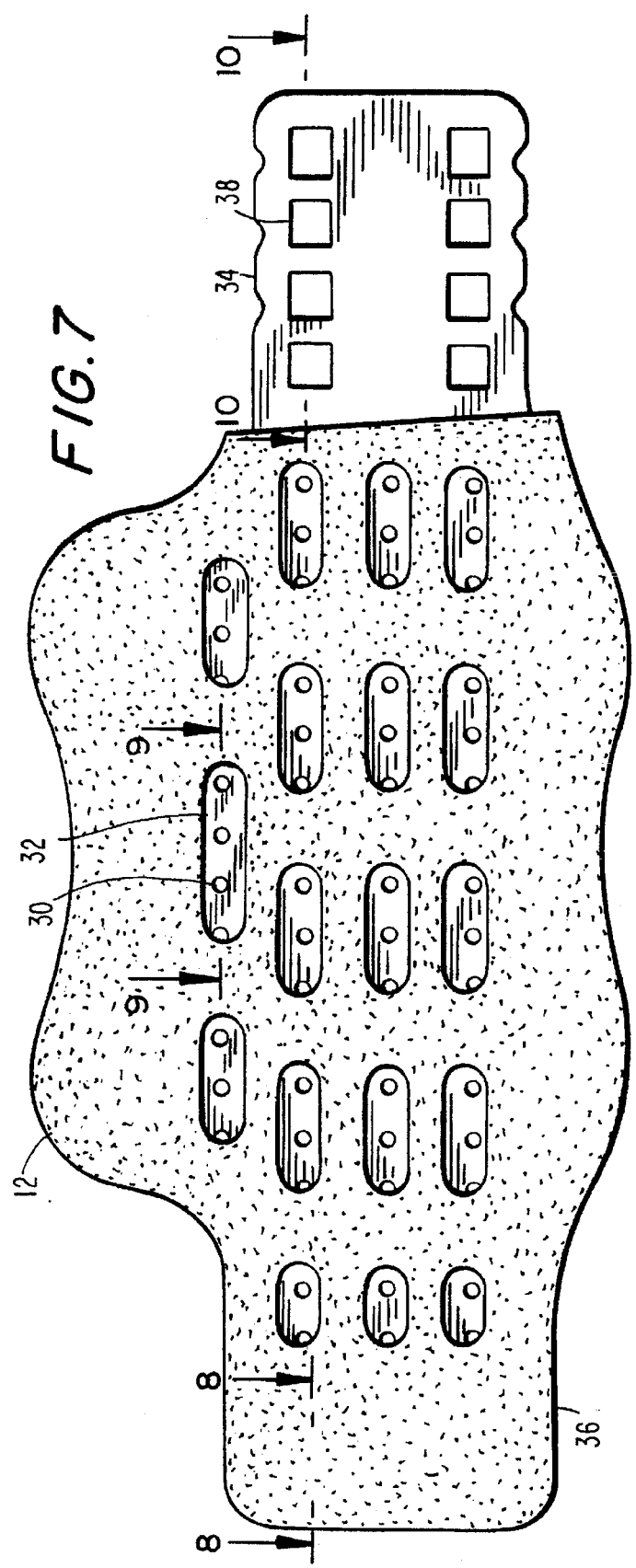
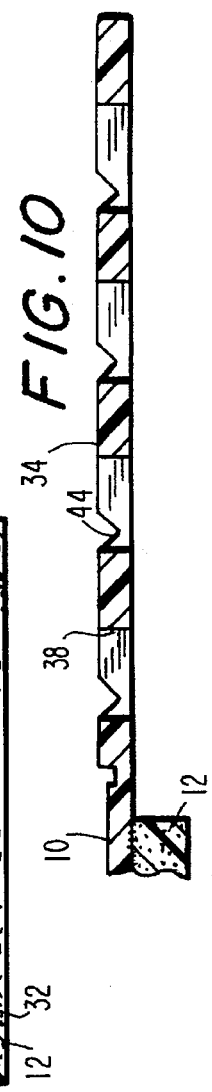
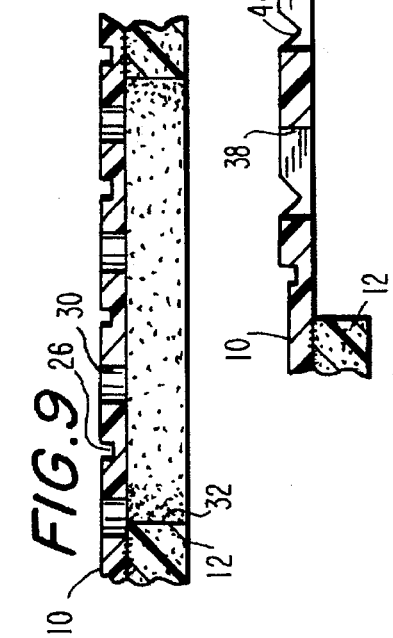
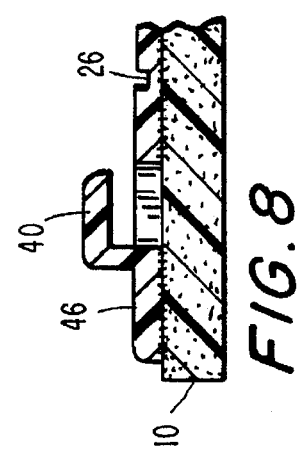

COLLAR FOR ANIMALS

BACKGROUND OF THE INVENTION

The invention relates to a collar for animals.

A collar for animals is known in the form of a cone-shaped stiff device fixed around the animal's neck. This collar's cone-opening projects at least partly over the animal's head. Due to the size and stiffness of this cone-shaped collar, the animal (especially a dog) is greatly hampered in its mobility and is likely to knock against stair-cases, doors, pieces of furniture, etc., because the head is protrudingly jacketed. Furthermore the hearing and visual field of the animal are largely reduced.

SUMMARY OF THE INVENTION

It is an object of the present invention to provide a collar which prevents animals after medical treatment from licking parts of their body and from tearing off bandages. This collar is to impede the animal as little as possible and to offer comfort of wearing while providing sufficient stiffness and keeping the head clear to a large extent.

This object is obtained by providing a collar that is shaped as a supporting tube closely adjusted to the animal's neck with a front edge that extends behind the animal's head, thus preventing the animal from turning its head backward.

Such a supporting tube is not bulky, but rather is close-fitting and allows the animal to move naturally with only little hindrance. Furthermore other possible injuries are prevented due to the animal's free mobility and sight.

BRIEF DESCRIPTION OF THE DRAWINGS

FIG. 3 is a plan view of another embodiment of an animal collar in an open and flat configuration before being placed around an animal's neck.

FIG. 4 is a partial cross sectional view taken along the line 4—4 in FIG. 3.

FIG. 5 is a partial cross sectional view taken along the line 5—5 in FIG. 3.

FIG. 6 is a partial cross sectional view taken along the line 6—6 in FIG. 3.

FIG. 7 is a bottom view of the animal collar shown in FIG. 3 in an open and flat configuration before being placed around the animal's neck.

FIG. 8 is a partial cross sectional view taken along the line 8—8 in FIG. 7.

FIG. 9 is a partial cross sectional view taken along the line 9—9 in FIG. 7.

FIG. 10 is a partial cross sectional view taken along the line 10—10 in FIG. 7.

DESCRIPTION OF THE PREFERRED EMBODIMENTS

Figure 1:
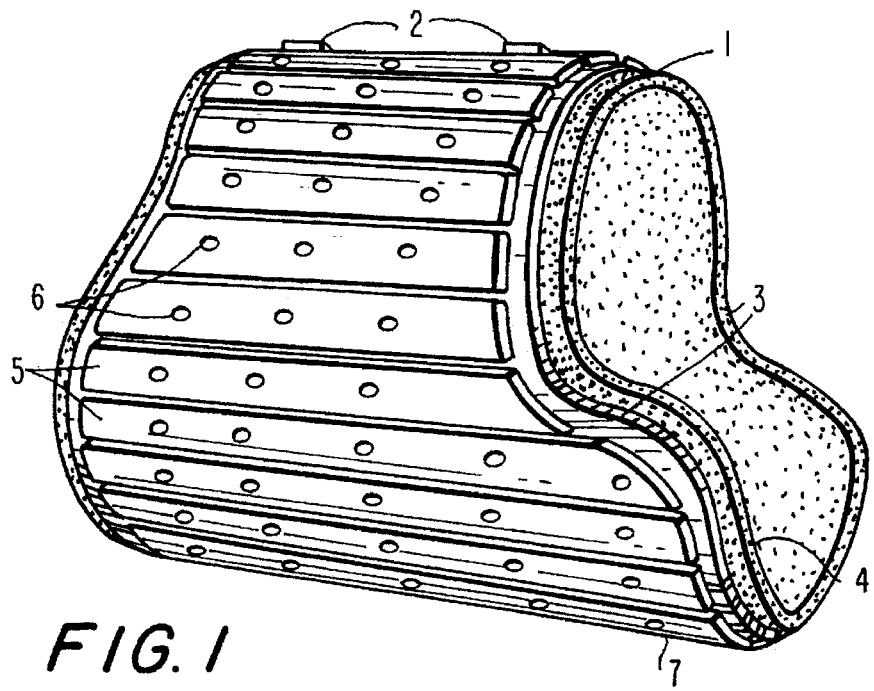
FIG. 1 is a perspective view of an animal collar according to one embodiment of the invention.

The collar mainly consists of a thin-walled elastomeric synthetic material which is initially flat but which can be formed into a tube-shaped shell. This shell in put around the animal's neck like a ring and is closed with a fastener 2.

The fastener 2 may take various forms, for example, it may be a burr-like fastener such as Velcro, a zipper, laces, removable adhesive tape, a buckle and the like. These fastener provides variable adjustment for adaption to different neck sizes.

By providing an adjustable fastener, a snug-fitting, adjustment is achieved which does not only avoid an unpleasant pressure on the animal's neck and excludes a twist of the collar but extends behind the jaw-bones, thus preventing turning of the animal's head.

The collar has an outside layer 7 of plastic material and an inside padding of expanded plastics 4, which is flat at least along the edge, to improve comfortable wearing. The collar can also be used without the above-mentioned padding. In such a case the edges of the tube may be provided with beveled edges. Ribs running lengthwise 5 are shaped as reinforcement profiles. The collar has holes 6, which provide for circulation of the air so that comfortable wearing is not adversely affected by perspiration of the hide or skin. The padding of expanded plastic also has perforations.

The collar is adapted to be worn by animals such as a dog as shown in the drawings. It has a front edge facing the head with a curved part 3 which extends under and behind the animal's head in a way that it is sufficiently directed to the front. Thus the animal cannot turn back its head towards its body to like wounds, tear off bandages, etc.

From the head the tubular collar reaches down to the chest and shoulders of the animal so that it is snug-fitting for the most part and props itself on the stronger body-zones of the chest and neck of the animal so that it cannot be pushed further backward by movements of the head.

Unlike the aforesaid prior art collars which extend over the head towards the front and which do not prevent the animal's licking by protecting the head wall with an umbrella-like arrangement towards the side and the back, thus creating an extremely voluminous and bulky protecting device, the collar of the present invention is relatively snug and natural-fitting and impedes the animal's mobility only as far as it concerns the backward movement of the head.

It is therefore necessary that the structure of the collar fitted to the animal is sufficiently rigid, which is generally achieved by a light construction due to the tubular from of the collar as long as it is adequately rigid against denting, breaking or folding.

Material can be provided having a stiff form. Furthermore, collars of synthetic foam can be made with resilient material, light and sufficiently stiff, whereby the thickness of the wall is dependent on the desired rigidity of the form and strain against the animal's backward turning of its head.

As shown in the drawings, the collar is adjusted as well as possible to the animal's anatomy. This is especially achieved by an outline of the front edge which is best adapted to the animal's back of the head and nape. A corresponding rear edge outline is provided also around the chest and neck to avoid pressure sores by line-like adaption of the collar edge to the body.

In addition to this, the edges of the collar are rounded or padded. In the simplest case the edges or the whole inner collar is underlaid with a pad, i.e. with a layer of expanded plastic which is quick to clean and does not get easily dirty. Thus, even with a relatively strong and thin-walled material of the shell-shaped collar, a sufficient comport of wearing and especially an adequate safety against sores can be achieved.

But even without any padding material, the edges can be chamfered by bending them outwardly or backwardly if necessary. A lateral trumpet-like expansion can be achieved with deep-drawn or spray-molded synthetic material. The edge can also be made flexible by cuttings made at right angle to the rim.

The collar need not be tightly adjusted to the animal's neck all over. It is sufficient if the edges at the head and body are a good, end-sided sit on the animal and if the interjacent part in its tube-like form is rigid enough to keep the animal's head away from its body.

Both an adequate width of the collar with a corresponding distance from the animal's neck and sufficient ventilation openings in the collar surface ensure good air flow without a barrier effect on humidity and heat under the collar.

The sue of laces or adhesive tapes for the fastener can provide an infinitely variable adjustment mechanism for the collar. With the use of synthetic material plastic-processing joint techniques could be used, such as fasteners with one-piece plastic hooks and hook-holes on the opposite side or clips which can be pressed together like snap fasteners. These are arranged for easy use and observation preferably in a line, roughly running along the animal's neckline. By a multiple arrangement of such connecting elements at a right angle to the connecting line, a gradual adjustment of the width of the collar can be provided.

With an appropriate adjustment of the width a certain relationship to the length can be achieved in that the body surface of the animal's head on the one hand and of the trunk on the other hand, provided for the adjustment with the collar, can be made slant or cone-shaped respectively.

It is possible to construct such a collar which is variable in its length. In the simplest case, e.g. along the trunk-line intersections, perforations and the like can be provided to shorten the collar. But it is also possible to make the collar of two overlapping longitudinal parts which through a plurality of snaps, through adhesive clasps and the like, can be adjusted to an appropriate length.

Figure 2:
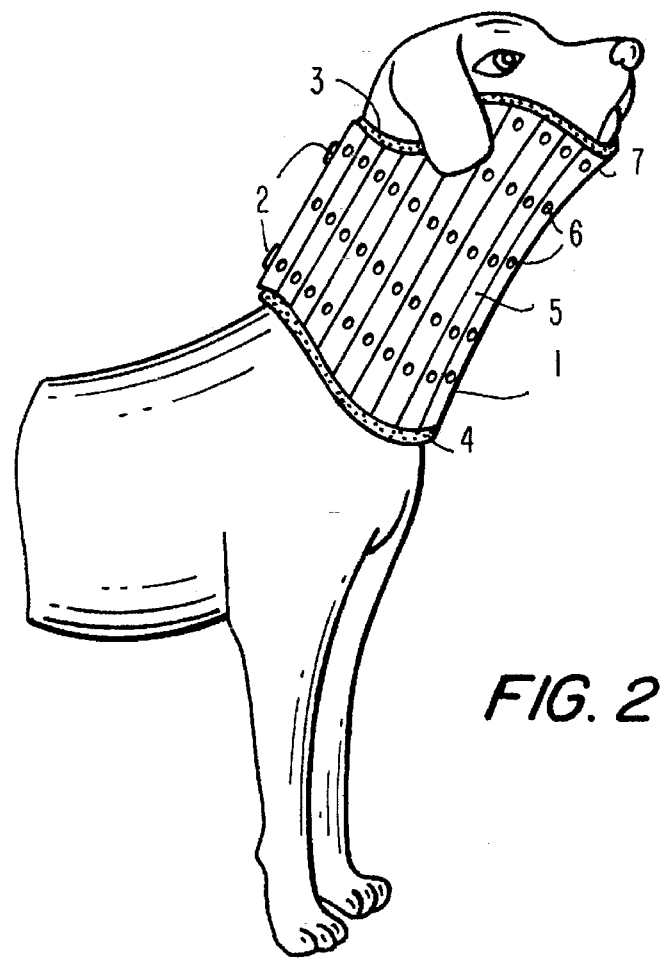
FIG. 2 is another perspective view of the animal collar shown in FIG. 1.
Figure 11:
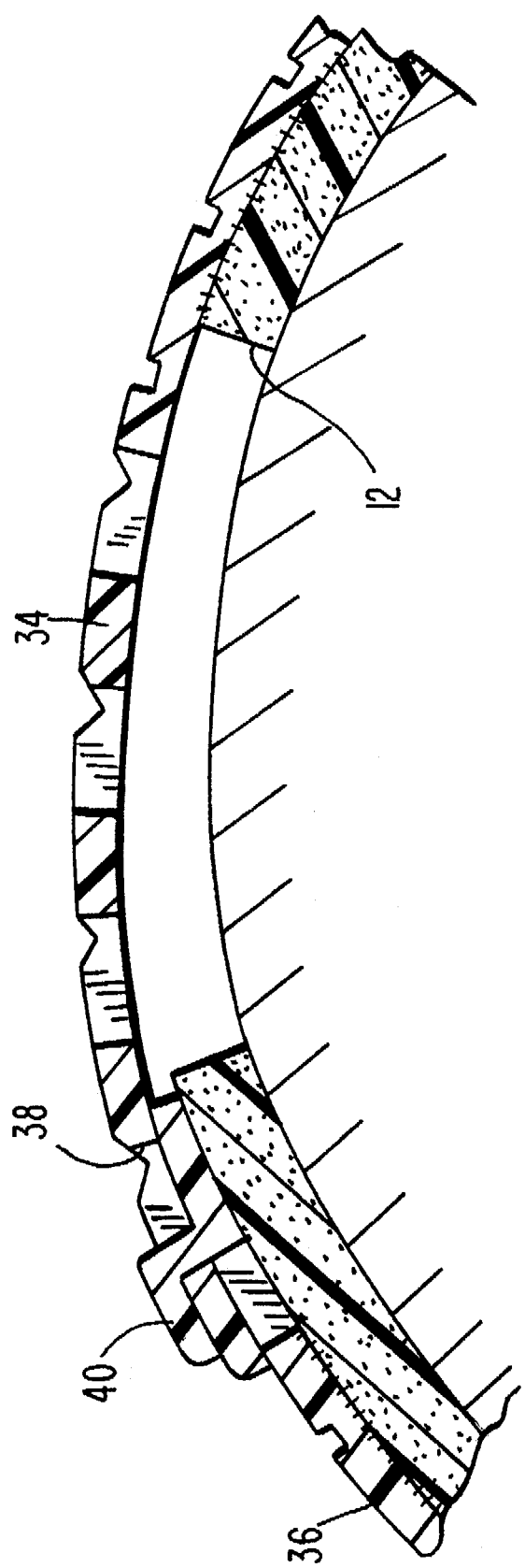
FIG. 11 is an elongated partial cross sectional view of the animal collar showing the fastener in a fastened condition.

FIGS. 3–10 show a further embodiment in which FIG. 3 shows the collar in an open and flat condition before it is placed around an animal's neck. The collar has a material manufactured flat state as shown in FIG. 3 but is flexible so that it can be formed into a tube-like collar so that is can be placed around an animal's neck as shown in FIGS. 1 and 2.

The collar consists of a outer plastic layer 10 (for example polypropylene or polyethylene) and an inner padding layer of plastic foam 12 (for example EVA foam) which are joined together by adhesive or the like. Parts of the forward edge 14 and parts of the rear edge 16 of the inner layer 12 extend beyond the respective forward edge 18 and rear edge 20 of the outer layer 10 to define respective marginal edge portions 22 and 24 of foam material.

The outer layer 10 is provided with a plurality of indentations 26 which enhance the flexibility of the collar when it is flexible from its flat state in FIG. 3 to a tube-like state around an animal's neck.

A plurality of openings 30 are provided in the outer layer 10 and many of these openings 30 are aligned with oblong opening 32 in the inner foam layer 12 to thereby form through openings which provide ventilation openings in the collar.

The outer plastic layer 10 is provided with extending parts 34 and 36 on which fastening means are provided. Thus the extending part 34 which does not have an underlying layer of plastic foam material as shown in FIG. 7, has a plurality of openings 38 which provide for adjusting the diameter of the tube-like collar when it is placed around an animal's neck. The other extended part 36, which does have an underlying layer of foam material 12, is provided with raised hook-like elements 40 which selectively engage any pair of the pairs of openings 38 in the extended part 34.

The extended part 34 may be provided with thickened sections 42 about the openings 38 to enhance the strength in that area. The extended part 34 is also provided with indentations 44 to enhance flexibility. The extended part 36 is also provided with thickened sections 46 to enhance the strength in the area of the hook-like elements 40.

The outer plastic layer 10 has a rear edge portion 50 and a front edge portion 54 which are thinner than the remaining portions of the outer plastic layer 10. However, a part of the rear edge portion 50 of the outer plastic layer 10 is provided with a thicker section 56 to enhance the strength in that area. The thickened portion 56 has indentations 57 to enhance flexibility. On the other hand, a part of the forward edge portion 54 of the outer plastic layer 10 is provided with a plurality of spaced parallel slits 60 to enhance flexibility in that area.

What is claimed is:

1. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved further up along the animal's neck, said rear edge extending to the chest and shoulders of said animal such that the chest and shoulders of the animal prevent the tube from being moved further down along the animal's neck, whereby said collar structure prevents the animal from licking parts of his body, said collar structure comprising an outer layer of non-foam plastic material, an inner layer of foam plastic material and means adhering said outer layer of non-foam plastic material to said inner layer of foam plastic material, said tube having a forward edge portion extending from said forward edge to a demarcation line, said outer layer of non-foam plastic material and said inner layer of foam plastic material together extending up to said demarcation line, said outer layer of non-foam plastic material having a forward terminating edge terminating at said demarcation line, said inner layer of foam plastic material continuing to extend from said demarcation line to said forward edge of said tube such that said foam plastic material forms said forward edge portion.

2. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved further up along the animal's neck, said rear edge extending to the chest and shoulders of said animal such that the chest and shoulders of the animal prevent the tube from being moved further down along the animal's neck, whereby said collar structure prevents the animal from licking parts of his body, said collar structure comprising an outer layer of non-foam plastic material, an inner layer of foam plastic material and means adhering said outer layer of non-foam plastic material to said inner layer of foam plastic material, said tube having a rear edge portion extending from said rear edge to a demarcation line, said outer layer of non-foam plastic material and said inner layer of foam plastic material together extending to said demarcation line, said outer layer of non-foam plastic material having a rearward terminating edge terminating at said demarcation line, said inner layer of foam plastic material continuing to extend from said demarcation line to said rear edge of said tube such that said foam plastic material forms said rear edge portion.

3. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved further up along the animal's neck, said rear edge extending to the chest and shoulders of said animal such that the chest and shoulders of the animal prevent the tube from being moved further down along the animal's neck, whereby said collar structure prevents the animal from licking parts of his body, said outer layer of plastic material having a forward edge, said outer layer of plastic material having a central main part with one thickness, traverse indentations traversing said central main part, the sections of said outer layer of plastic material underlying said transverse indentations having a thickness less than said one thickness, said outer layer of plastic material having a forward border edge portion extending inwardly from said forward edge, said forward border edge portion having a thickness less than said one thickness.

4. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved further up along the animal's neck, said rear edge extending to the chest and shoulders of said animal such that the chest and shoulders of the animal prevent the tube from being moved further down along the animal's neck, whereby said collar structure prevents the animal from licking parts of his body, said tube having a longitudinal axis, said forward edge of said tube having an upper part adapted to be disposed on top of an animal's neck and a lower part adapted to be disposed underneath an animal's neck, said upper part of said forward edge being disposed in a first plane generally perpendicular to said longitudinal axis, said lower part of said forward edge being disposed in a second plane generally perpendicular to said longitudinal axis, said second plane being disposed forwardly of said first plane.

5. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved furhter up along the animal's neck, said rear edge extending to the chest and shoulders of said animal such that the chest and shoulders of the animal prevent the tube from being moved further down along the animal's neck, whereby said collar structure prevents the animal from licking parts of his body, said tube having a longitudinal axis, said forward edge of said tube having an upper part adapted to be disposed on top of an animal's neck and a lower part adapted to be disposed underneath an animal's neck, said lower part being longitudinally spaced forwardly of said upper part, said forward edge having an intermediate part between said upper part and said lower part, said intermediate part having an arcuate configuration.

6. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved further up along the animal's neck, said rear edge extending to the chest and shoulders of said animal such that the chest and shoulders of the animal prevent the tube from being moved further down along the animal's neck, whereby said collar structure prevents the animal from licking parts of his body, said tube having a longitudinal axis, said rear edge of said tube having an upper part adapted to be disposed on top of an animal's neck and a lower part adapted to be disposed underneath an animal's neck, said upper part of said rear edge being disposed in a first plane generally perpendicular to said longitudinal axis, said lower part of said rear edge being disposed in a second plane generally perpendicular to said longitudinal axis, said second plane being disposed rearwardly of said first plane.

7. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said forward edge extending up to and under the animal's head such that the head of the animal prevents the tube from being moved further up along the animal's neck, said rear edge extending to the chest and shoulders of said animal such that the chest and shoulders of the animal prevent the tube from being moved further down along the animal's neck, whereby said collar structure prevents the animal from licking parts of his body, said tube having a longitudinal axis, said rear edge of said tube having an upper part adapted to be disposed on top of an animal's neck and a lower part adapted to be disposed underneath an animal's neck, said lower part being longitudinally spaced rearwardly of said upper part, said rear edge having an intermediate part between said upper part and said lower part, said intermediate part having an arcuate configuration.

8. A neck collar for preventing animals from licking parts of their body, said collar comprising a collar structure having a closed position and an open position, fastener means on said collar structure for fastening said collar structure in said closed position in which said collar structure is disposed about an animal's neck, said fastener means being operable to unfasten said collar structure to said open position to enable placement and removal of the collar structure from around an animal's neck, said collar structure when in said closed position being in the form of an elongated tube which is disposed about the animal's neck, said tube having a forward edge and a rear edge, said collar structure comprising an outer layer of non-foam plastic material, an inner layer of foam plastic material and means adhering said outer layer of non-foam plastic material to said inner layer of foam plastic material, said tube having a forward edge portion extending from said forward edge to a demarcation line, said outer layer of non-foam plastic material and said inner layer of foam plastic material together extending up to said demarcation line, said outer layer of non-foam plastic material having a forward terminating edge terminating at said demarcation line, said inner layer of foam plastic material continuing to extend from said demarcation line to said forward edge of said tube such that said foam plastic material forms said forward edge portion.

* * * * *